(12) United States Patent
Moriishi

(10) Patent No.: US 10,916,807 B2
(45) Date of Patent: Feb. 9, 2021

(54) LITHIUM AIR BATTERY THAT INCLUDES NONAQUEOUS LITHIUM ION CONDUCTOR

(71) Applicant: Panasonic Intellectual Property Management Co., Ltd., Osaka (JP)

(72) Inventor: Masako Moriishi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 93 days.

(21) Appl. No.: 16/174,153

(22) Filed: Oct. 29, 2018

(65) Prior Publication Data

US 2019/0165419 A1   May 30, 2019

(30) Foreign Application Priority Data

Nov. 30, 2017 (JP) .................................. 2017-230480
Jul. 2, 2018 (JP) .................................. 2018-126242

(51) Int. Cl.
| | |
|---|---|
| *H01M 10/0568* | (2010.01) |
| *H01M 12/08* | (2006.01) |
| *H01M 10/0567* | (2010.01) |
| *H01M 12/06* | (2006.01) |
| *H01M 10/0525* | (2010.01) |
| *H01M 10/42* | (2006.01) |

(52) U.S. Cl.
CPC ... *H01M 10/0568* (2013.01); *H01M 10/0525* (2013.01); *H01M 10/0567* (2013.01); *H01M 10/4235* (2013.01); *H01M 12/06* (2013.01); *H01M 12/08* (2013.01); *H01M 2300/0025* (2013.01); *H01M 2300/0091* (2013.01); *Y02E 60/10* (2013.01)

(58) Field of Classification Search
None
See application file for complete search history.

(56) References Cited

U.S. PATENT DOCUMENTS

2016/0261013 A1   9/2016  Hase et al.
2016/0344031 A1   11/2016  Takechi

FOREIGN PATENT DOCUMENTS

| JP | 2009-259764 | 11/2009 |
| JP | 2010-033890 | 2/2010 |
| JP | 2010-165615 | 7/2010 |
| JP | 2015-069960 | 4/2015 |
| JP | 2016-162686 | 9/2016 |
| JP | 2016-219424 | 12/2016 |

OTHER PUBLICATIONS

Gao et al., "A rechargeable lithium-oxygen battery with dual mediators stabilizing the carbon cathode," Nature Energy 2 (article 17118), Jul. 31, 2017.*
Benjamin J. Bergner et al., "Understanding the fundamentals of redox mediators in Li-O2 batteries: a case study on nitroxides", Phys. Chem. Chem. Phys., Oct. 26, 2015, 17, 31769-31779.

* cited by examiner

*Primary Examiner* — Jonathan Crepeau
(74) *Attorney, Agent, or Firm* — McDermott Will and Emery LLP

(57) ABSTRACT

A lithium air battery includes: a negative electrode configured to occlude and release lithium ions; a positive electrode configured to use oxygen in air as a positive electrode active material; and a nonaqueous lithium ion conductor disposed between the negative electrode and the positive electrode. The nonaqueous lithium ion conductor contains a compound.

5 Claims, 2 Drawing Sheets

LITHIUM AIR BATTERY THAT INCLUDES NONAQUEOUS LITHIUM ION CONDUCTOR

BACKGROUND

1. Technical Field

The present disclosure relates to a lithium air battery that includes nonaqueous lithium ion conductor.

2. Description of the Related Art

A lithium air battery is a battery in which as a positive electrode active material, oxygen in the air is used, and as a negative electrode active material, a metal or a compound configured to occlude and release lithium ions is used. The lithium air battery has advantages in that the energy density is high, the reduction in size can be easily achieved, and the reduction in weight can also be easily achieved. Hence, the lithium air battery has drawn attention as a battery having an energy density higher than that of a lithium ion battery which is currently considered to have the highest energy density.

In the lithium air battery, lithium peroxide is precipitated on a positive electrode by a discharge reaction and is then decomposed by a charge reaction. Since the electron conductivity of lithium peroxide is low, the lithium air battery generally exhibits a high overvoltage during charge. As a result, the charge potential is increased, and the energy efficiency is decreased.

SUMMARY

One non-limiting and exemplary embodiment provides a technique which decreases the charge potential of a lithium air battery and which improves cycle characteristics thereof.

In one general aspect, the techniques disclosed here feature a lithium air battery comprising: a negative electrode configured to occlude and release lithium ions; a positive electrode configured to use oxygen in air as a positive electrode active material; and a nonaqueous lithium ion conductor disposed between the negative electrode and the positive electrode. In the lithium air battery described above, the nonaqueous lithium ion conductor contains a compound represented by the following formula (1).

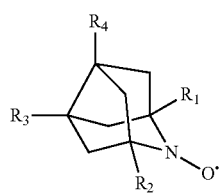

(1)

In the formula (1), $R_1$ and $R_2$ each independently represent a hydrogen atom or a functional group having an electron-donating property, and at least either $R_1$ or $R_2$ is the functional group having an electron-donating property. $R_3$ and $R_4$ each independently include at least one selected from the group consisting of a hydrogen atom, a halogen atom, a chain aliphatic group, a cyclic aliphatic group, a hydroxy group, a nitro group, a nitroso group, an amino group, a sulfo group, a sulfate group, an alkoxycarbonyl group, a vinyl group, an epoxy group, a methacryl group, an acryloyl group, an ureido group, a mercapto group, and an isocyanate group, and the chain or the cyclic aliphatic group may include at least one selected from the group consisting of a halogen atom, a nitrogen atom, an oxygen atom, a sulfur atom, a silicon atom, and a phosphorus atom.

According to an aspect of the present disclosure, the charge potential of the lithium air battery can be decreased, and the cycle characteristics of the lithium air battery can also be improved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
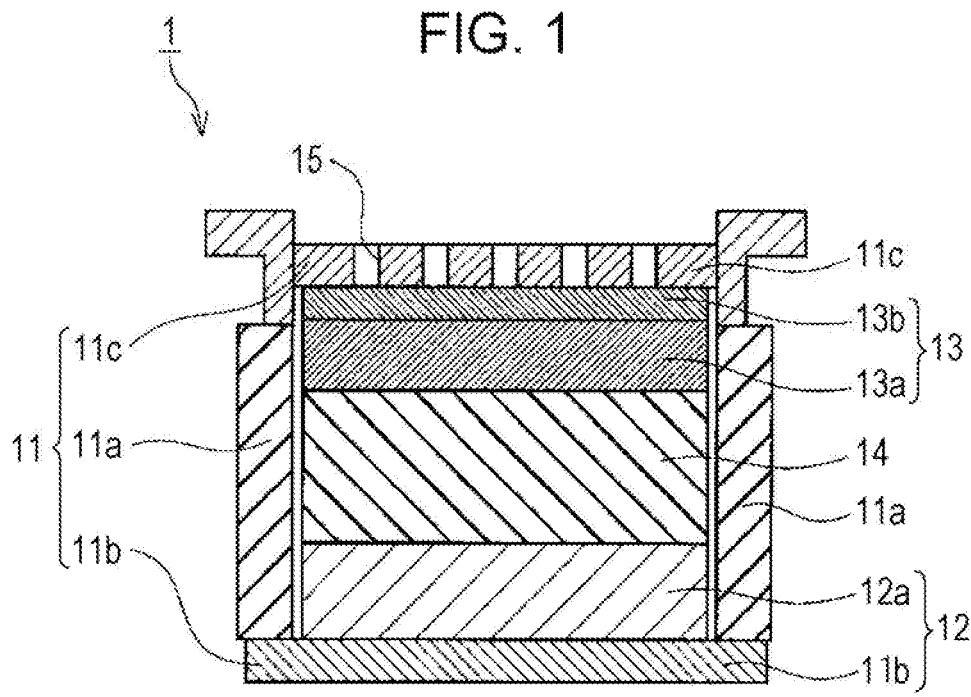
FIG. 1 is a schematic cross-sectional view of a lithium air battery according to one embodiment of the present disclosure.

DETAILED DESCRIPTION (Underlying Knowledge Forming Basis of the Present Disclosure)

In order to promote the decomposition of lithium peroxide, the use of a catalyst to produce oxygen (also called "redox mediator") has been proposed.

In the lithium air batteries disclosed in Japanese Patent Nos. 4816693, 5434086, and 5315831, as the catalyst to produce oxygen, a derivative (hereinafter, referred to as "TEMPO derivative") of 2,2,6,6-tetramethylpyperidine-1-oxyl (TEMPO) is used. The TEMPO derivative is contained in an electrolyte liquid or a positive electrode. Since mediating the transfer of electrons between the positive electrode and lithium peroxide, the catalyst to produce oxygen promotes the decomposition of lithium peroxide and decreases the charge potential.

In the lithium air battery disclosed in "Understanding the fundamentals of redox mediators in Li—O$_2$ batteries: a case study on nitroxides", Phys. Chem. Chem. Phys., 2015, 17, 31769-31779, by Benjamin J. Bergner et al., as the catalyst to produce oxygen, a TEMPO derivative, 2-azaadamantane-N-oxyl (AZADO), or 1-methyl-2-azaadamantane-N-oxyl (1-Me-AZADO) is used. Those catalysts to produce oxygen are each dissolved in an electrolyte liquid and decrease the charge potential of the lithium air battery.

Those catalysts to produce oxygen disclosed in the above related technical documents are each a compound to be changed into an oxoammonium cation by one-electron oxidation and are each called a nitroxyl radical compound. When the nitroxyl radical compound decomposes lithium peroxide, the nitroxyl radical compound is simultaneously reduced. Accordingly, the nitroxyl radical is regenerated. The nitroxyl radical thus regenerated is again changed into a cation body on the surface of a positive electrode and is then allowed to react with lithium peroxide. As described above, while being repeatedly oxidized and reduced, the nitroxyl radical compound decomposes lithium peroxide.

The nitroxyl radical compounds disclosed in Japanese Patent Nos. 4816693, 5434086, and 5315831, and "Understanding the fundamentals of redox mediators in Li—$O_2$ batteries: a case study on nitroxides", Phys. Chem. Chem. Phys., 2015, 17, 31769-31779, by Benjamin J. Bergner et al. each exhibit a redox potential of 3.5 V (vs. Li/Li$^+$) or more. The decomposition of lithium peroxide is initiated by the generation of a cation body by oxidation of the nitroxyl radical compound. Hence, it is believed that by the use of a compound having a low redox potential as the catalyst to produce oxygen, the charge potential of the lithium air battery can be further decreased.

Based on the knowledge described above, the present inventors carried out intensive research in order to solve the problem of the lithium air battery in that a charge reaction does not easily proceed, and the charge/discharge cycle characteristics are not sufficient. As a result, a lithium air battery according to one aspect of the present disclosure was finally completed.

Summary of Aspects According to the Present Disclosure

A lithium air battery according to a first aspect of the present disclosure comprises: a negative electrode configured to occlude and release lithium ions; a positive electrode configured to use oxygen in air as a positive electrode active material; and a nonaqueous lithium ion conductor disposed between the negative electrode and the positive electrode. The nonaqueous lithium ion conductor contains: a compound represented by the following formula (1), and at least one selected from the group consisting of 2,5-di-tert-butyl-1,4-benzoquinone and 2,6-di-tert-butyl-1,4-benzoquinone.

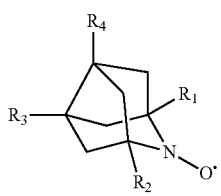

(1)

In the formula (1), $R_1$ and $R_2$ each independently represent a hydrogen atom or a functional group having an electron-donating property, and at least either $R_1$ or $R_2$ is the functional group having an electron-donating property. $R_3$ and $R_4$ each independently include at least one selected from the group consisting of a hydrogen atom, a halogen atom, a chain aliphatic group, a cyclic aliphatic group, a hydroxy group, a nitro group, a nitroso group, an amino group, a sulfo group, a sulfate group, an alkoxycarbonyl group, a vinyl group, an epoxy group, a methacryl group, an acryloyl group, an ureido group, a mercapto group, and an isocyanate group, and the chain or the cyclic aliphatic group may include at least one selected from the group consisting of a halogen atom, a nitrogen atom, an oxygen atom, a sulfur atom, a silicon atom, and a phosphorus atom.

According to the first aspect, since the compound represented by the formula (1) functions as a charging catalyst which efficiently decomposes lithium peroxide, the charge potential is decreased. Besides the promotion of the decomposition of lithium peroxide, since application of a high voltage to each member of the lithium air battery can be avoided, the degradation of each member caused by oxidation can be suppressed, and hence, the cycle characteristics of the lithium air battery are also improved. In addition, 2,5-di-tert-butyl-1,4-benzoquinone and 2,6-di-tert-butyl-1,4-benzoquinone each have an effect of further decreasing the charge potential.

In the TEMPO derivatives disclosed in the related technical documents, since four methyl groups are provided around the NO position (N-oxyl group) which is a redox portion, the radical is sterically protected and is stabilized. If the four methyl groups are each substituted by a hydrogen atom, the TEMPO derivative is rapidly disproportioned, so that a nitrone and a hydroxylamine are generated.

Compared to the TEMPO derivatives disclosed in the related technical documents, in the compound represented by the formula (1), while the stability of the radical is maintained, the steric hindrance around the redox portion is small. Hence, a reaction site between the compound represented by the formula (1) and lithium peroxide is wide, and hence, the reaction site is likely to be brought into contact with lithium peroxide. In addition, since the redox potential of the compound represented by the formula (1) is low as compared to the redox potential of each of the TEMPO derivatives disclosed in the related technical documents, the compound represented by the formula (1) can decompose lithium peroxide at a lower potential. Hence, since the compound represented by the formula (1) is used as a redox mediator, when a lithium air battery is charged, lithium peroxide can be efficiently decomposed. As a result, the charge potential can be sufficiently decreased. In addition, improvement in cycle characteristics of a lithium air battery can also be expected.

According to a second aspect of the present disclosure, for example, in the lithium air battery of the first aspect, in the above formula (1), $R_1$ and $R_2$ each may be the functional group having an electron-donating property. When $R_1$ and $R_2$ are each the functional group having an electron-donating property, the redox potential of the compound represented by the formula (1) can be sufficiently shifted to a low side.

According to a third aspect of the present disclosure, for example, in the lithium air battery of the first or the second aspect, the functional group of $R_1$ or the functional group of $R_2$ may be a hydrocarbon group. In the compound represented by the formula (1), the hydrocarbon group reliably exhibits an electron-donating property.

According to a fourth aspect of the present disclosure, for example, in the lithium air battery of the third aspect, at least either the hydrocarbon group of $R_1$ or the hydrocarbon group $R_2$ has 1 to 3 carbon atoms. When the number of carbon atoms of the hydrocarbon group of $R_1$ or $R_2$ is equal to or more than one and less than four, while the decrease in reactivity caused by the steric hindrance is suppressed, the redox potential can be shifted to a low side.

A lithium air battery according to a fifth aspect of the present disclosure comprises: a negative electrode configured to occlude and release lithium ions; a positive electrode configured to use oxygen in air as a positive electrode active material; and a nonaqueous lithium ion conductor disposed between the negative electrode and the positive electrode. The nonaqueous lithium ion conductor contains a compound represented by the following formula (1).

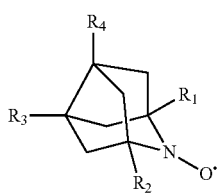

(1)

In the formula (1), $R_1$ and $R_2$ each independently represent a hydrocarbon group having 1 to 3 carbon atoms; $R_3$ and $R_4$ each independently include at least one selected from the group consisting of a hydrogen atom, a halogen atom, a chain aliphatic group, a cyclic aliphatic group, a hydroxy group, a nitro group, a nitroso group, an amino group, a sulfo group, a sulfate group, an alkoxycarbonyl group, a vinyl group, an epoxy group, a methacryl group, an acryloyl group, an ureido group, a mercapto group, and an isocyanate group; and the chain or the cyclic aliphatic group may include at least one selected from the group consisting of a halogen atom, a nitrogen atom, an oxygen atom, a sulfur atom, a silicon atom, and a phosphorus atom.

According to the fifth aspect, since the compound represented by the formula (1) functions as a charging catalyst which efficiently decomposes lithium peroxide, the charge potential is decreased. Since the decomposition of lithium peroxide is not only promoted, but application of a high voltage to each member of the lithium air battery can also be avoided, the degradation of each member caused by oxidation is suppressed, and hence, the cycle characteristics of the lithium air battery are also improved.

According to a sixth aspect of the present disclosure, for example, in the lithium air battery of any one of the third to the fifth aspects, the hydrocarbon group of $R_1$ and/or the functional group of $R_2$ each may be a methyl group. When the hydrocarbon group of $R_1$ and/or the functional group of $R_2$ are each a methyl group, the steric hindrance around the redox portion is small, and hence, the redox potential can also be shifted to a low side.

According to a seventh aspect of the present disclosure, for example, in the lithium air battery of any one of the first to the sixth aspects, in the formula (1), $R_3$ and $R_4$ each may be a hydrogen atom. When $R_3$ and $R_4$ are each a hydrogen atom, since the compound represented by the formula (1) has a small molecular diameter, an excellent reactivity is obtained.

According to an eighth aspect of the present disclosure, for example, in the lithium air battery of any one of the first to the seventh aspects, the concentration of the compound in the nonaqueous lithium ion conductor may be 0.01 mmol/liter or more. According to the eighth aspect, an effect of promoting the decomposition of lithium peroxide and an effect of improving the cycle characteristics of the lithium air battery can be sufficiently obtained.

According to a ninth aspect of the present disclosure, for example, in the lithium air battery of any one of the first to the fourth aspects, the concentration of at least one selected from the group consisting of 2,5-di-tert-butyl-1,4-benzoquinone and 2,6-di-tert-butyl-1,4-benzoquinone in the nonaqueous lithium ion conductor may be 0.01 mmol/liter or more. When the concentration of at least one selected from the group consisting of 2,5-di-tert-butyl-1,4-benzoquinone and 2,6-di-tert-butyl-1,4-benzoquinone is appropriately controlled, the effects described above can be sufficiently obtained.

According to a tenth aspect of the present disclosure, for example, in the lithium air battery of any one of the first to the ninth aspects, the nonaqueous lithium ion conductor may further contain tetraethylene glycol dimethyl ether. Since tetraethylene glycol dimethyl ether does not easily evaporate and is stable against oxygen radicals, tetraethylene glycol dimethyl ether is suitable for the nonaqueous lithium ion conductor of the lithium air battery.

Embodiment

Hereinafter, an embodiment of the present disclosure will be described with reference to the drawings. The present disclosure is not limited to the following embodiment.

FIG. 1 is a schematic cross-sectional view of a lithium air battery according to one embodiment of the present disclosure. As shown in FIG. 1, a lithium air battery 1 of this embodiment includes a battery case 11, a negative electrode 12, a positive electrode 13, and an electrolyte layer 14 functioning as a nonaqueous lithium ion conductor. The battery case 11 includes a cylindrical portion 11a in which a top surface side and a bottom surface side are opened, a bottom portion 11b provided so as to close the bottom surface-side opening of the cylindrical portion 11a, and a lid portion 11c provided so as to close the top surface-side opening of the cylindrical portion 11a. In the lid portion 11c, air inlet holes 15 introducing air into the battery case 11 are provided. The negative electrode 12 includes a negative electrode layer 12a disposed on an upper surface of the bottom portion 11b of the battery case 11. The bottom portion 11b of the battery case 11 also functions as a negative electrode collector of the negative electrode 12. That is, the bottom portion 11b also functioning as the negative electrode collector and the negative electrode layer 12a collectively form the negative electrode 12. The positive electrode 13 is formed of a positive electrode layer 13a containing a carbon material and a positive electrode collector 13b disposed between the positive electrode layer 13a and the lid portion 11c of the battery case 11. The electrolyte layer 14 of the lithium air battery 1 may include a separator. Besides the bottom portion 11b, a negative electrode collector may also be provided.

A battery reaction in the lithium air battery 1 having the structure as described above is as follows.

Discharge reaction (that is, a reaction while the battery is used)

$$\text{negative electrode: } 2Li \rightarrow 2Li^+ + 2e^- \tag{A1}$$

$$\text{positive electrode: } 2Li^+ + 2e^- + O_2 \rightarrow Li_2O_2 \tag{A2}$$

Charge reaction (that is, a reaction while the battery is charged)

$$\text{negative electrode: } 2Li^+ + 2e^- \rightarrow 2Li \tag{A3}$$

$$\text{positive electrode: } Li_2O_2 \rightarrow 2Li^+ + 2e^- + O_2 \tag{A4}$$

During the discharge, as shown by the formulas (A1) and (A2), electrons and lithium ions are released from the negative electrode 12. When electrons are incorporated into the positive electrode 13, oxygen incorporated from the outside of the battery simultaneously reacts with lithium ions at the positive electrode 13, and lithium peroxide is generated. During the charge, as shown by the formulas (A3) and (A4), electrons and lithium ions are incorporated into the negative electrode 12. From the positive electrode 13, electrons, lithium ions, and oxygen are released. A charging catalyst is a material promoting the reaction shown by the formula (A4). Alternatively, the air battery may use another lithium oxide (e.g., $Li_2O$) as a discharge product instead of lithium peroxide.

Next, the individual members of the lithium air battery 1 as described above will be described in detail.

1. Positive Electrode

As described above, the positive electrode 13 includes the positive electrode layer 13a and may further include the positive electrode collector 13b. Hereinafter, the positive electrode layer 13a and the positive electrode collector 13b will be described respectively.

(Positive Electrode Layer)

The positive electrode layer 13a contains a material which enables oxygen in the air to be oxidized and reduced as a positive electrode active material. As the material described above, the positive electrode layer 13a of this embodiment contains an electrically conductive porous material containing carbon. A carbon material to be used as the electrically conductive porous material containing carbon may have a high electron conductivity. In particular, there may be used a carbon material, such as acetylene black or Ketjen black, which is generally used as an electrically conductive auxiliary agent. In view of the specific surface area and the size of primary particles, electrically conductive carbon black, such as Ketjen black, may be used. The carbon material is generally a powder. The specific surface area of the carbon material is, for example, 800 to 2,000 $m^2/g$ and may also be 1,200 to 1,600 $m^2/g$. When the specific surface area of the carbon material is in the range as described above, the positive electrode layer 13a is easily formed to have a fine pore structure. The specific surface area is a value to be measured by a BET method.

The positive electrode layer 13a may further contain a binder fixing the above electrically conductive porous material. As the binder, a material known as the binder for the positive electrode layer 13a of the lithium air battery 1 may be used. As the binder, for example, a poly(vinylidene fluoride) (PVdF) or a polytetrafluoroethylene (PTFE) may be mentioned. The content of the binder in the positive electrode layer 13a is not particularly limited and is, for example, in a range of 1 to 40 percent by mass.

Since being changed in accordance with the application of the lithium air battery 1, the thickness of the positive electrode layer 13a is not particularly limited. The thickness of the positive electrode layer 13a is, for example, in a range of 2 to 500 μm and may also be in a range of 5 to 300 μm.

The positive electrode layer 13a may be formed, for example, by the following method. A carbon material and a solvent are mixed together to prepare a mixture. If needed, additives, such as a binder, may also be contained in the mixture. The mixture (to be used as a coating liquid) thus obtained is applied on the positive electrode collector 13b by a coating method, such as a doctor blade method, and at least one coating film thus obtained was then dried. Accordingly, the positive electrode 13 is obtained. A sheet-shaped positive electrode layer 13a without provided with the positive electrode collector 13b may be formed in such a way that after the coating film of the mixture is dried, the dried coating film is rolled by a roll press method or the like. The sheet-shaped positive electrode layer 13a may also be directly formed by compression pressing of the carbon material.

(Positive Electrode Collector)

The positive electrode collector 13b is a member collecting electric charges of the positive electrode layer 13a. A material of the positive electrode collector 13b is not particularly limited as long as having an electrical conductivity. As the material of the positive electrode collector 13b, for example, stainless steel, nickel, aluminum, iron, titanium, or carbon may be mentioned. As the shape of the positive electrode collector 13b, for example, a foil shape, a plate shape, or a mesh (such as a grid) shape may be mentioned. In this embodiment, the shape of the positive electrode collector 13b may be a mesh shape. The reason for this is that a mesh-shaped positive electrode collector 13b is excellent in electric charge collection efficiency. In this case, the mesh-shaped positive electrode collector 13b may be disposed in the positive electrode layer 13a. The lithium air battery 1 of this embodiment may further include another positive electrode collector 13b (such as a foil-shaped collector) collecting electric charges collected by the mesh-shaped positive electrode collector 13b. In this embodiment, the battery case 11 which will be described later may also have a function of the positive electrode collector 13b. The thickness of the positive electrode collector 13b is, for example, in a range of 10 to 1,000 μm and may also be in a range of 20 to 400 μm.

2. Negative Electrode

As described above, the negative electrode 12 includes the negative electrode collector and may further include the negative electrode layer 12a. Hereinafter, the negative electrode layer 12a and the negative electrode collector will be described respectively.

(Negative Electrode Layer)

The negative electrode layer 12a of this embodiment may contain a negative electrode active material capable of occluding and releasing lithium ions. As the negative electrode active material described above, a material is not particularly limited as long as containing a lithium element, and for example, there may be mentioned metal lithium which is a simple metal, an alloy containing a lithium element, an oxide containing a lithium element, or a nitride containing a lithium element. As the alloy containing a lithium element, for example, there may be mentioned a lithium aluminum alloy, a lithium tin alloy, a lithium lead alloy, or a lithium silicon alloy. As the metal oxide containing a lithium element, for example, there may be mentioned a lithium titanium oxide. As the metal nitride containing a lithium element, for example, there may be mentioned a lithium cobalt nitride, a lithium iron nitride, or a lithium manganese nitride.

The negative electrode layer 12a may contain only the negative electrode active material or may also contain a binder besides the negative electrode active material. When the negative electrode active material has a foil shape, the negative electrode layer 12a may contain only the negative electrode active material. When the negative electrode active material is a powder, the negative electrode layer 12a may contain both the negative electrode active material and the binder. As the binder, a material known as the binder for the negative electrode layer 12a of the lithium air battery 1 may be used, and for example, a PVdF or a PTFE may be mentioned. The content of the binder in the negative electrode layer 12a is not particularly limited and may be, for example, in a range of 1 to 40 percent by mass. As a method for forming the negative electrode layer 12a using a powdered negative electrode active material, as is the method for forming the positive electrode layer 13a described above, a formation method, such as a doctor blade method or a compression pressing method, may be used.

(Negative Electrode Collector)

The negative electrode collector is a member collecting electric charges of the negative electrode layer 12a. A material of the negative electrode collector is not particularly limited as long as having an electrical conductivity. A material known as the negative electrode collector of the lithium air battery may be used. As the material of the negative electrode collector, for example, copper, stainless steel, nickel, or carbon may be mentioned. As the shape of the negative electrode collector, for example, there may be mentioned a foil shape, a plate shape, or a mesh (such as a grid) shape. The negative electrode collector may be formed from a porous material having an irregular surface. The battery case 11 which will be described later may also function as the negative electrode collector.

3. Separator

The lithium air battery 1 of this embodiment may include a separator disposed between the positive electrode 13 and the negative electrode 12. Since the separator is disposed between the positive electrode 13 and the negative electrode 12, a highly safe battery can be obtained. As long as having a function of electrically separating the positive electrode layer 13a from the negative electrode layer 12a, the separator is not particularly limited. As the separator, for example, a porous insulating material may be used, and a porous film, such as a polyethylene (PE) porous film or a polypropylene (PP) porous film; a resin non-woven cloth, such as a PE non-woven cloth or a PP non-woven cloth; a glass fiber non-woven cloth: a paper non-woven cloth, or the like may be mentioned.

The porosity of the separator is, for example, in a range of 30% to 90%. When the porosity is in the range as described above, a sufficient amount of the electrolyte can be held in the separator, and at the same time, the separator has a sufficient strength. The porosity of the separator may also be in a range of 35% to 60%. The porosity can be calculated from the true density, the total volume including pores, and the weight of the material.

4. Electrolyte Layer

The electrolyte layer 14 is disposed between the positive electrode 13 and the negative electrode 12 and is a layer conducting lithium ions. The electrolyte layer 14 may have any structure as long as being a lithium ion conductor having a lithium ion conductivity and may have either a solution system structure represented by an organic solvent system containing a lithium salt as the electrolyte or a solid film system structure represented by a high molecular weight solid electrolyte system containing a lithium salt. Regardless of whether the electrolyte is a solid or a gel, the mediator contained in the electrolyte is able to cause an electrochemical reaction on the surface of the positive electrode 13.

When the electrolyte layer 14 is a solution system, a nonaqueous electrolyte liquid prepared by dissolving a lithium salt in a nonaqueous solvent may be used as the electrolyte layer 14.

As the lithium salt contained as the electrolyte in a nonaqueous electrolyte liquid, for example, although lithium perchlorate ($LiClO_4$), lithium hexafluorophosphate ($LiPF_6$), lithium tetrafluoroborate ($LiBF_4$), lithium trifluoromethanesulfonate ($LiCF_3SO_3$), or lithium bistrifluoromethanesulfonylamide ($LiN(CF_3SO_2)_2$) may be mentioned, the lithium salt is not limited thereto. A lithium salt known as the electrolyte of the nonaqueous electrolyte liquid of the lithium air battery 1 may also be used.

The concentration of the electrolyte in the nonaqueous electrolyte liquid is, for example, 0.5 to 2.5 mol/liter. When a nonaqueous electrolyte liquid which is a solution system electrolyte layer 14 is used, as described above, the non-aqueous electrolyte liquid is impregnated and held in the separator, so that the electrolyte layer 14 is formed.

As the nonaqueous solvent, nonaqueous solvents known as the nonaqueous solvents of the nonaqueous electrolyte liquid of the lithium air battery 1 may be used. For example, a chain ether, such as tetraethylene glycol dimethyl ether or tetraethylene glycol diethyl ether, may be used. Compared to a carbonate-based solvent, the chain ether is not likely to cause a side reaction other than the redox reaction of oxygen in the positive electrode 13. In particular, tetraethylene glycol dimethyl ether is unlikely to evaporate and stable against oxygen radicals. As another nonaqueous solvent, dimethylsulfoxide may be mentioned.

The lithium air battery 1 of this embodiment further contains a nitroxyl radical compound as the catalyst to produce oxygen. The nitroxyl radical compound of this embodiment is represented by the following formula (1).

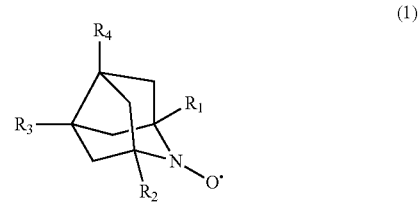

(1)

The compound represented by the formula (1) is an organic compound having a bridge ring structure including a nitroxyl radical. Since having a robust and symmetric adamantane skeleton with a small strain, the compound represented by the formula (1) can be significantly stably present in the form of a free radical.

In this embodiment, the nitroxyl radical compound is contained in the electrolyte layer 14 which is the nonaqueous lithium ion conductor. When the lithium air battery 1 is charged, the nitroxyl radical compound is changed into a cation body by oxidation on the surface of the positive electrode 13. This cation body functions as a charging catalyst promoting the decomposition of lithium peroxide.

When a nonaqueous electrolyte liquid is used as the electrolyte layer 14, the nitroxyl radical compound is dissolved in a nonaqueous solvent forming the nonaqueous electrolyte liquid. Hence, the nitroxyl radical compound can be abundantly present around the positive electrode 13. The concentration of the nitroxyl radical compound in the nonaqueous electrolyte liquid is, for example, 0.01 mmol/liter or more. The upper limit of the concentration of the nitroxyl radical compound in the nonaqueous electrolyte liquid is, for example, 200 mmol/liter. When the concentration of the nitroxyl radical compound is appropriately controlled, the effect described above can be sufficiently obtained.

In the compound represented by the formula (1), $R_1$ and $R_2$ are bonded to the α carbons adjacent to the N-oxyl group functioning as the redox portion. When at least either $R_1$ or $R_2$ is a functional group having an electron-donating property, the redox potential of the compound represented by the formula (1) can be shifted to a low side. When $R_1$ and $R_2$ are each a functional group having an electron-donating property, this effect can be more sufficiently obtained. The structure of $R_1$ may be the same as or different from the structure of $R_2$.

As the functional group having an electron-donating property, for example, a hydrocarbon group may be mentioned. In the compound represented by the formula (1), the hydrocarbon group reliably exhibits an electron-donating property.

The hydrocarbon group is typically an alkyl group, such as a methyl group or an ethyl group. When electrons are partially donated from the 6 bond of the alkyl group to the N-oxyl group, a radical is stabilized by a hyperconjugation effect. As the length of the alkyl chain is increased, the redox potential is shifted to a low side. However, when the length of the alkyl chain is excessively large, the influence of the steric hindrance is increased, and the reactivity between the compound represented by the formula (1) and $Li_2O_2$ may be decreased in some cases. When the number of carbons of the hydrocarbon group is equal to or more than one and less than four, while the decrease in reactivity caused by the steric hindrance is suppressed, the redox potential can be shifted to a low side. When the hydrocarbon group is a methyl group, the steric hindrance around the redox portion is small, and the redox potential can also be shifted to a low side.

In the compound represented by the formula (1), $R_3$ and $R_4$ each may independently include at least one selected from the group consisting of a hydrogen atom, a halogen atom, a chain aliphatic group, a cyclic aliphatic group, a hydroxy group, a nitro group, a nitroso group, an amino group, a sulfo group, a sulfate group, an alkoxycarbonyl group, a vinyl group, an epoxy group, a methacryl group, an acryloyl group, an ureido group, a mercapto group, and an isocyanate group. The chain or the cyclic aliphatic group may include at least one selected from the group consisting of a halogen atom, a nitrogen atom, an oxygen atom, a sulfur atom, a silicon atom, and a phosphorus atom.

In the compound represented by the formula (1), $R_3$ and $R_4$ are located apart from the redox portion. Hence, the influence of $R_3$ and $R_4$ on the redox potential is small. From this point of view, the structures of $R_3$ and $R_4$ are not limited. When $R_3$ and $R_4$ are each a hydrogen atom, since having a small molecular diameter, the compound represented by the formula (1) has a superior reactivity.

When $R_1$ and $R_2$ are each a methyl group, the nitroxyl radical compound of the present disclosure is represented by the following formula (2). When $R_1$ and $R_2$ are each a methyl group, and $R_3$ and $R_4$ are each a hydrogen atom, the nitroxyl radical compound of the present disclosure is represented by the following formula (3). The compound represented by the following formula (3) is 1,5-dimethyl-9-azanoradamantane-N-oxyl (DMN-AZADO).

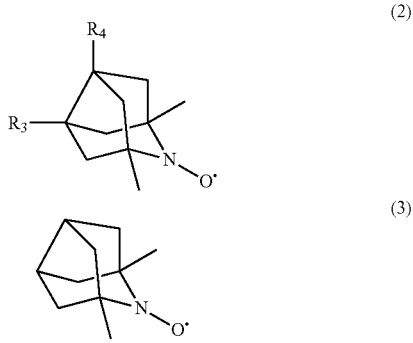

The presence of the compound represented by the formula (1) may be confirmed, for example, by $^1$H-NMR measurement.

The lithium air battery 1 of this embodiment may further contain an n-type redox molecule mediating the transfer of electrons in a discharge reaction. As the n-type redox molecule, at least one selected from the group consisting of 2,5-di-tert-butyl-1,4-benzoquinone represented by the following formula (4) and 2,6-di-tert-butyl-1,4-benzoquinone represented by the following formula (5) may be used.

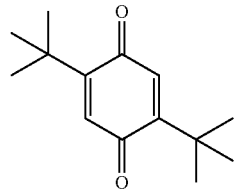

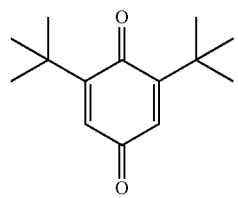

In addition, 2,5-di-tert-butyl-1,4-benzoquinone and 2,6-di-tert-butyl-1,4-benzoquinone (each of which is called DBBQ) are n-type redox molecules having a redox potential of approximately 2.6 V (vs. Li/Li$^+$) and having redox characteristics similar to each other and are each transformed into an anion body (DBBQ$^-$) upon reception of an electron from the positive electrode 13 during discharge. DBBQ$^-$ is stabilized by forming a complex (LiDBBQO$_2$) with Li$^+$ and O$_2$. It is believed that two molecules of this complex are then disproportioned, and as a result, lithium peroxide is generated.

Since DBBQ mediates the transfer of electrons, lithium peroxide can be generated not only on the surface of the positive electrode 13 but also in the electrolyte liquid (in the vicinity of the positive electrode 13) slightly apart from the surface of the positive electrode 13. That is, DBBQ which receives an electron from the positive electrode 13 diffuses in the electrolyte liquid by the concentration gradient, and as a result, a reaction field in which lithium peroxide is generated is increased. Hence, lithium peroxide is generated in such a way that many particles generated at different positions are deposited on the surface of the positive electrode 13. When DBBQ is not used, since the transfer of electrons is performed only on the surface of the positive electrode 13, lithium peroxide is generated so as to cover the surface of the positive electrode 13. If the discharge capacity is assumed to be equal between the case in which DBBQ is used and the case in which no DBBQ is used, in the case in which DBBQ is used, the surface area of lithium peroxide at the positive electrode 13 is large as compared to that in the case in which DBBQ is not used. Since the reaction area between lithium peroxide and the cation body of the redox mediator functioning as the catalyst to produce oxygen is increased during the charge, the catalyst effect to be obtained is enhanced, and as a result, lithium peroxide can be more efficiently decomposed. As a result, the charge potential of the lithium air battery 1 is further decreased.

When a nonaqueous electrolyte liquid is used as the electrolyte layer 14, DBBQ is dissolved in a nonaqueous solvent forming the nonaqueous electrolyte liquid. Hence, DBBQ can be abundantly present around the positive electrode 13. The concentration of DBBQ in the nonaqueous electrolyte liquid is, for example, 0.01 mmol/liter or more. The upper limit of the concentration of DBBQ in the nonaqueous electrolyte liquid is, for example, 200 mmol/liter. When the concentration of DBBQ is appropriately controlled, the effect described above can be sufficiently obtained. When 2,5-di-tert-butyl-1,4-benzoquinone and 2,6-di-tert-butyl-1,4-benzoquinone are both contained in the nonaqueous electrolyte liquid as DBBQ, the total of their concentrations is the concentration of DBBQ.

5. Battery Case

As long as capable of receiving the positive electrode 13, the negative electrode 12, and the electrolyte layer 14 as described above, the battery case 11 of the lithium air battery 1 of this embodiment may have any shape. The shape of the battery case 11 of the lithium air battery 1 of this embodiment is not limited to the shape shown in FIG. 1, and various shapes, such as a coin type, a flat plate type, a cylindrical type, and a laminate type, may be used. The battery case 11 may be either an air-open type battery case or an airtight type battery case. The air-open type battery case has an airflow hole through which the air is charged and discharged and is a case in which the air is contactable with the positive electrode. When the airtight type battery case is used, a supply pipe and an exhaust pipe of a gas may be provided for the airtight type battery case. In this case, the gas to be supplied and exhausted may be dry air. In addition, the gas to be supplied and exhausted may have a high oxygen concentration or may be pure oxygen (e.g., oxygen concentration: 99.99%). The oxygen concentration may be high during discharge and may be low during charge.

EXAMPLES

Hereinafter, the present disclosure will be described in more detail with reference to examples. Although the following examples will be described by way of example, the present disclosure is not limited thereto.

Example 1

First, lithium bistrifluoromethanesulfonylamide (LiTFSA, manufactured by Kishida Chemical Co., Ltd.) was mixed with and dissolved in tetraethylene glycol dimethyl ether (TEGDME, manufactured by Kishida Chemical Co., Ltd.) to have a concentration of 1 mol/liter, so that a nonaqueous electrolyte liquid was obtained. In the nonaqueous electrolyte liquid thus obtained, 1,5-dimethyl-9-azanoradamantane-N-oxyl (DMN-AZADO) was dissolved at a concentration of 2 mmol/liter. As a work electrode, a counter electrode, and a reference electrode, a glassy carbon electrode, a platinum electrode, and an Ag/Ag$^+$ electrode (each electrode manufactured by BAS Inc.) were used, respectively, and cyclic voltammetry measurement was performed at a scan rate of 10 mV/sec.

Comparative Example 1

Except for that TEMPO was used instead of DMN-AZADO, the cycle voltammetry measurement was performed by the same method as that of Example 1.

Figure 2:
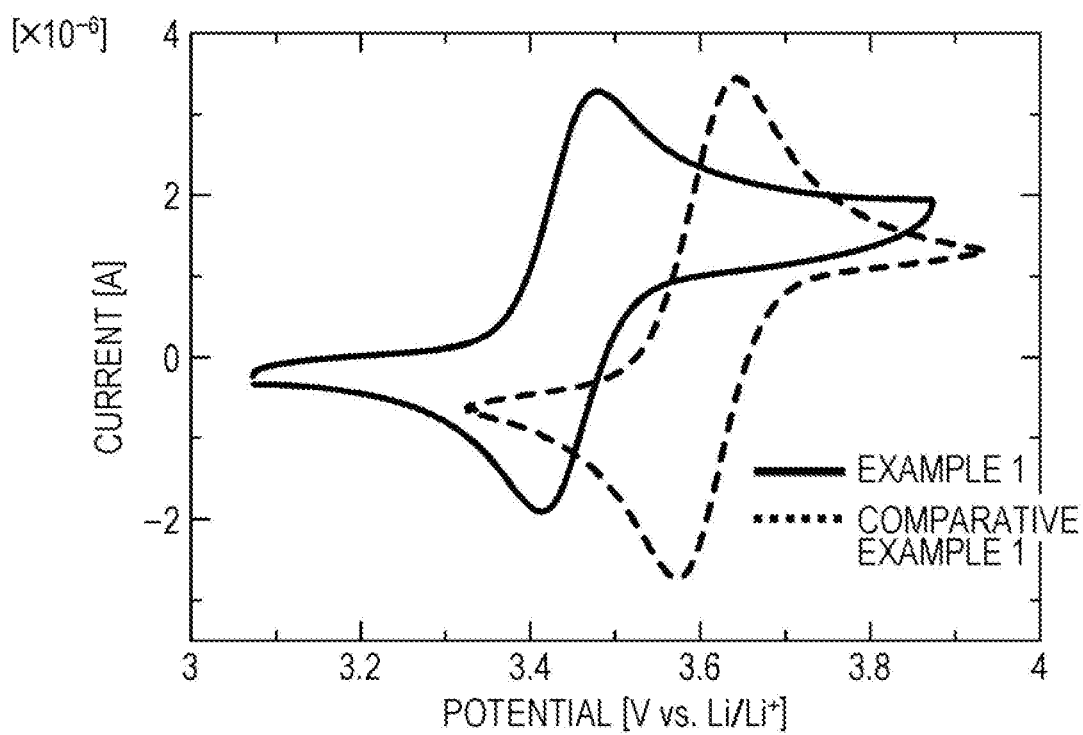
FIG. 2 is a graph showing a cyclic voltammogram of a compound of each of Example 1 and Comparative Example 1.

FIG. 2 shows a cyclic voltammogram of the compound of each of Example 1 and Comparative Example 1. As shown in FIG. 2, DMN-AZADO (Example 1) had a low redox potential as compared to that of TEMPO (Comparative Example 1).

According to a theoretical calculation, in the compound represented by the formula (1), when $R_1$ is a methyl group, and $R_2$ to $R_4$ are each a hydrogen atom, the redox potential of the compound represented by the formula (1) is high as compared to that of DMN-AZADO and is low as compared to that of TEMPO.

Example 2

As a carbon material, a powder of Ketjen black (manufactured by Lion Corporation) was used. As a binder, powdered PTFE (manufactured by Daikin Industries, Ltd.) was used. The carbon material and the binder were kneaded together at a mass ratio of 90:10 using an ethanol solvent, so that a mixture was obtained. The mixture was rolled using a roll press machine, so that an electrode sheet was formed. The electrode sheet thus obtained was cut, so that a positive electrode (positive electrode layer) was obtained.

LiTFSA was mixed with and dissolved in TEGDME to have a concentration of 1 mol/liter. The mixed solution thus obtained was stirred for 24 hours in a dry air atmosphere at a dew point of −50° C. or less, so that a nonaqueous electrolyte liquid was obtained. In the nonaqueous electrolyte liquid thus obtained, DMN-AZADO was dissolved to have a concentration of 20 mmol/liter.

As a separator, a glass fiber separator was prepared. A SUS304 mesh was adhered to metal lithium foil as a collector, so that a negative electrode was obtained. By the use of the positive electrode, the separator, the nonaqueous electrolyte liquid, and the negative electrode, a lithium air battery having the structure shown in FIG. 1 was formed.

Comparative Example 2

Except for that DMN-AZADO was not used, a lithium air battery of Comparative Example 2 was formed by the same method as that of Example 2.

Comparative Example 3

Except for that TEMPO was used instead of DMN-AZADO, a lithium air battery of Comparative Example 3 was formed by the same method as that of Example 2.
(Charge/Discharge Test)

Figure 3:
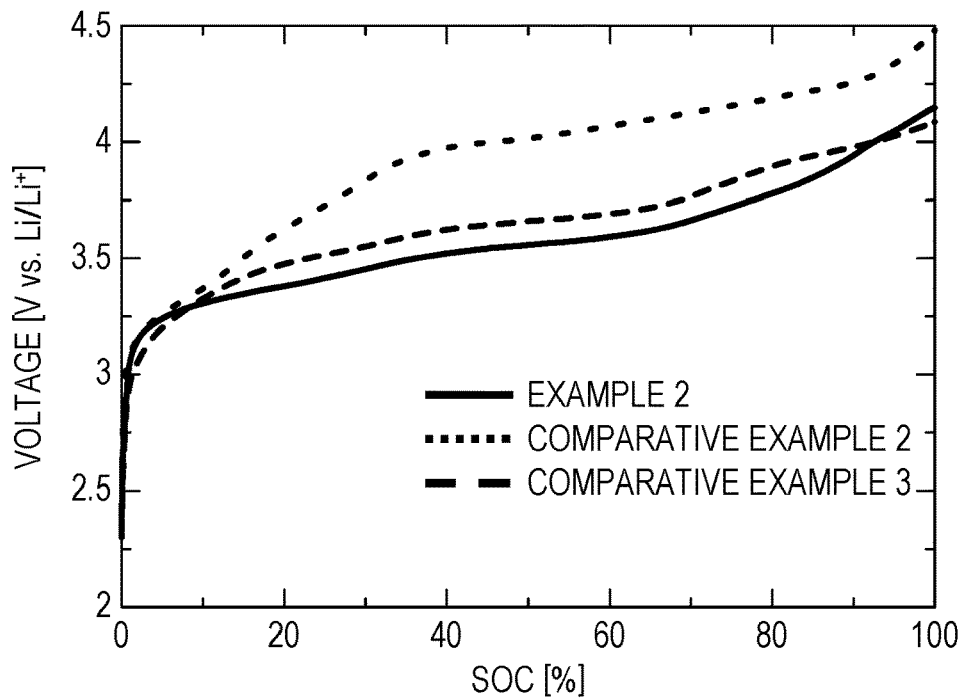
FIG. 3 is a graph showing the charge curve of a lithium air battery of each of Example 2 and Comparative Examples 2 and 3.

After the lithium air battery of each of Example 2 and Comparative Examples 2 and 3 was held for 20 minutes or more in an oxygen atmosphere, a charge/discharge test was performed. The current density during the discharge was 0.4 mA/cm$^2$, and the cutoff voltage was 2.0 V. The current density during the charge was 0.1 mA/cm$^2$, and the cutoff voltage was 4.5 V. After the discharge was performed, the charge was performed. The charge curves thus obtained are shown in FIG. 3. SOC (State of Charge) along the horizontal axis of FIG. 3 represents the charging rate, and the voltage along the vertical axis represents the battery voltage with respect to the redox potential of negative electrode lithium.

As shown in FIG. 3, the charge potential of the lithium air battery of Example 2 was lower than the charge potential of the lithium air battery of each of Comparative Examples 2 and 3. The reason for this is estimated that in Example 2, since being changed into a cation body by oxidation on the surface of the positive electrode, DMN-AZADO functions as a charging catalyst which efficiently decomposes lithium peroxide, and as a result, the charge potential is decreased.
(Charge/Discharge Cycle Test)

Under the same conditions as those for the charge/discharge test described above, a charge/discharge cycle test of the lithium air battery of each of Example 2 and Comparative Examples 2 and 3 was performed. In particular, the discharge and the charge were each repeatedly performed 3 times. The results of this charge/discharge cycle test are shown in Table 1. The capacity retention rate is represented by the rate of the discharge capacity of each cycle with respect to the discharge capacity of the first cycle.

TABLE 1

| CAPACITY RETENTION RATE (%) | EXAMPLE 2 | COMPARATIVE EXAMPLE 2 | COMPARATIVE EXAMPLE 3 |
|---|---|---|---|
| $1^{ST}$ CYCLE | 100 | 100 | 100 |
| $2^{ND}$ CYCLE | 84 | 75 | 89 |
| $3^{RD}$ CYCLE | 79 | 58 | 23 |

As shown in Table 1, compared to the lithium air battery of each of Comparative Examples 2 and 3, the discharge capacity of the lithium air battery of Example 2 was not likely to decrease. In the lithium air battery of Example 2, as the catalyst to produce oxygen (redox mediator), DMN-AZADO was used. The steric hindrance around the redox portion of DMN-AZADO is small, and the molecular diameter thereof is also small. Hence, it is estimated that DMN-AZADO functions as a charging catalyst which efficiently decomposes lithium peroxide. In addition, DMN-AZADO is likely to be brought into contact with lithium peroxide, so that lithium peroxide is rapidly decomposed. Hence, in the lithium air battery of Example 2, it is believed that since DMN-AZADO not only decreases the charge potential during the charge process but also promotes the decomposition of lithium peroxide, the cycle characteristics of the lithium air battery are improved.

As shown in the graph of FIG. 3, in the lithium air battery of Comparative Example 3, the effect of decreasing the charge potential by TEMPO functioning as the redox mediator was also obtained. However, the effect of decreasing the charge potential in Comparative Example 3 is lower than the effect obtained in Example 2. Hence, it is believed that the reactivity between TEMPO and $Li_2O_2$ is lower than the reactivity between DMN-AZADO and $Li_2O_2$. Compared to DMN-AZADO, the steric hindrance around the N-oxyl group of TEMPO is large. It is estimated that this difference in steric hindrance has an influence on the effect of decreasing the charge potential.

As shown in the graph of FIG. 3, the oxidation potential of TEMPO was reflected in the charge potential at the first cycle, and a low charge potential was obtained. However, when the reaction between TEMPO (TEMPO$^+$) in an oxidized state and $Li_2O_2$ is not allowed to smoothly occur, even after the charge is performed, a large amount of $Li_2O_2$ also remains in the positive electrode. It is estimated that since most of pores of the positive electrode were filled with the remaining $Li_2O_2$ and $Li_2O_2$ precipitated by the discharge at the second cycle, and in the following charge, since the function of TEMPO was also low, $Li_2O_2$ could not be sufficiently decomposed, and the discharge at a third cycle did not occur easily.

As the reason the capacity retention rate at the third cycle of Comparative Example 3 is inferior to that of Comparative Example 2, for example, deactivation of the redox mediator at the surface of the negative electrode may also be mentioned. Unless otherwise the surface of the negative electrode is covered with a gel electrolyte or the like, or the contact between the redox mediator and lithium functioning as the negative electrode is blocked by a solid electrolyte or the like, the deactivation problem cannot be avoided. However, when a redox mediator, such as TEMPO, the $Li_2O_2$ decomposition effect of which is not high, is used, it is estimated that demerits caused by the deactivation are more than merits.

Example 3

Except for that the mass ratio of the carbon material to the binder was changed to 70:30, and 2,5-di-tert-butyl-1,4-benzoquinone (2,5-DBBQ) was additionally dissolved in the nonaqueous electrolyte liquid at a concentration of 10 mmol/liter, a lithium air battery of Example 3 was formed by the same method as that of Example 2.

Example 4

Except for that 2,6-di-tert-butyl-1,4-benzoquinone (2,6-DBBQ) was used instead of 2,5-di-tert-butyl-1,4-benzoquinone (2,5-DBBQ), a lithium air battery of Example 4 was formed by the same method as that of Example 3.

Comparative Example 4

Except for that 2,5-di-tert-butyl-1,4-benzoquinone (2,5-DBBQ) was used instead of DMN-AZADO, a lithium air battery of Comparative Example 4 was formed by the same method as that of Example 2.

(Charge/Discharge Test)

After the lithium air battery of Example 3 was held for 20 minutes or more in an oxygen atmosphere, a charge/discharge test was performed. The current density during the discharge was 0.4 mA/cm$^2$, and the cutoff voltage was 2.0 V. The current density during the charge was 0.1 mA/cm$^2$, and the cutoff voltage was 4.0 V. After the discharge was performed, the charge was performed. The charge/discharge test was also performed on the lithium air battery of Comparative Example 4. The charge curves thus obtained are shown in FIG. 4.

Figure 4:
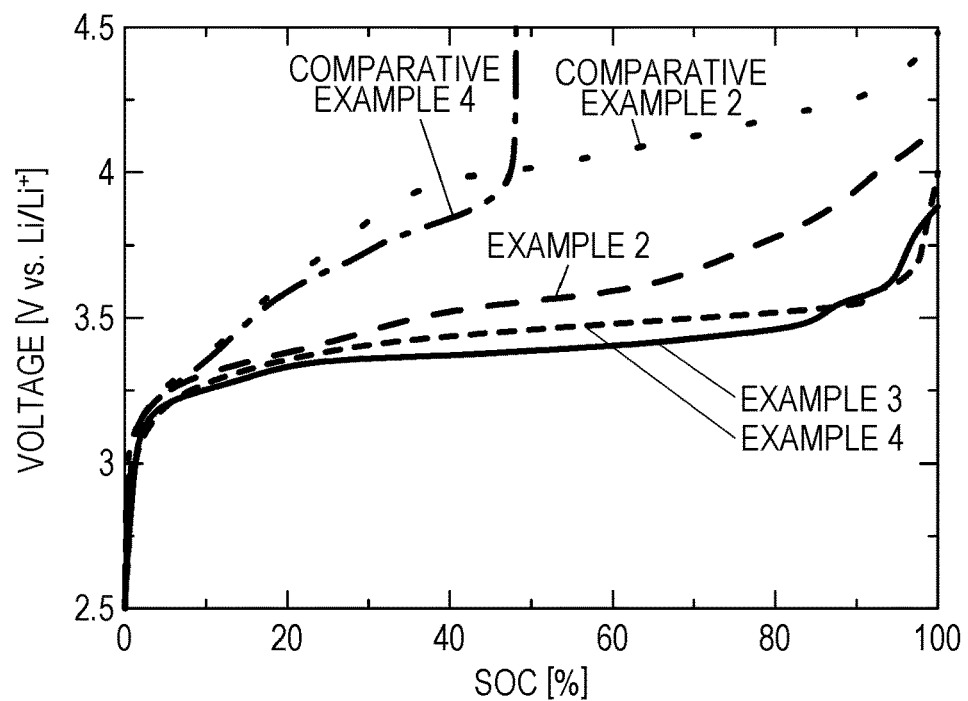
FIG. 4 is a graph showing the charge curve of a lithium air battery of each of Examples 2, 3, and 4 and Comparative Examples 2 and 4.

FIG. 4 shows the charge curves of the lithium air batteries of Example 2 and Comparative Example 2 besides the charge curves of the lithium air batteries of Examples 3 and 4 and Comparative Example 4. As shown in FIG. 4, the charge potential of the lithium air battery of each of Examples 3 and 4 was lower than the charge potential of the lithium air battery of Example 2. That is, by addition of 2,5-DBBQ or 2,6-DBBQ to the nonaqueous electrolyte liquid, the charge potential was further decreased.

In the lithium air battery of Comparative Example 4 containing only 2,5-DBBQ, the effect of decreasing the charge potential could not be obtained.

As described above, according to the technique of the present disclosure, the decomposition of lithium peroxide, which is a discharge product, is promoted, the charge potential of the lithium air battery is decreased, and the cycle characteristics thereof can be improved.

According to the technique of the present disclosure, while a high capacity is secured, the charge potential of the lithium air battery can be decreased, so that a lithium air battery having preferable charge/discharge cycle characteristics can be provided. Accordingly, the lithium air battery of the present disclosure is useful as a secondary battery.

What is claimed is:
1. A lithium air battery comprising:
  a negative electrode configured to occlude and release lithium ions;

a positive electrode configured to use oxygen in air as a positive electrode active material; and a nonaqueous lithium ion conductor disposed between the negative electrode and the positive electrode, wherein the nonaqueous lithium ion conductor contains:
a compound represented by the following formula (1); and
at least one selected from the group consisting of 2,5-di-tert-butyl-1,4-benzoquinone and 2,6-di-tert-butyl-1,4-benzoquinone, and

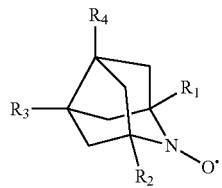

(1)

wherein in the formula (1), $R_1$ and $R_2$ each represent a methyl group; $R_3$ and $R_4$ each independently include at least one selected from the group consisting of a hydrogen atom, a halogen atom, a chain aliphatic group, a cyclic aliphatic group, a hydroxy group, a nitro group, a nitroso group, an amino group, a sulfo group, a sulfate group, an alkoxycarbonyl group, a vinyl group, an epoxy group, a methacryl group, an acryloyl group, an ureido group, a mercapto group, and an isocyanate group; and the chain or the cyclic aliphatic group may include at least one selected from the group consisting of a halogen atom, a nitrogen atom, an oxygen atom, a sulfur atom, a silicon atom, and a phosphorus atom.

2. The lithium air battery according to claim 1, wherein in the formula (1), $R_3$ and $R_4$ are each a hydrogen atom.

3. The lithium air battery according to claim 1, wherein the concentration of the compound in the nonaqueous lithium ion conductor is 0.01 mmol/liter or more.

4. The lithium air battery according to claim 1, wherein the concentration of at least one selected from the group consisting of 2,5-di-tert-butyl-1,4-benzoquinone and 2,6-di-tert-butyl-1,4-benzoquinone in the nonaqueous lithium ion conductor is 0.01 mmol/liter or more.

5. The lithium air battery according to claim 1, wherein the nonaqueous lithium ion conductor further contains tetraethylene glycol dimethyl ether.

* * * * *